US012671224B2

(12) United States Patent
McClean et al.

(10) Patent No.: US 12,671,224 B2
(45) Date of Patent: Jun. 30, 2026

(54) PUMP-SHARING AMONG REFLECTIVE OPTICAL AMPLIFIERS

(71) Applicant: II-VI Delaware, Inc., Wilmington, DE (US)

(72) Inventors: Ian Peter McClean, Brixham (GB); Martin R. Williams, Big Flats, NY (US)

(73) Assignee: II-VI DELAWARE, INC., Wilmington, DE (US)

( * ) Notice: Subject to any disclaimer, the term of this patent is extended or adjusted under 35 U.S.C. 154(b) by 491 days.

(21) Appl. No.: 18/239,192

(22) Filed: Aug. 29, 2023

(65) Prior Publication Data

US 2025/0079788 A1     Mar. 6, 2025

(51) Int. Cl.
*H01S 3/094* (2006.01)
*H01S 3/067* (2006.01)
*H01S 3/16* (2006.01)

(52) U.S. Cl.
CPC .... *H01S 3/094061* (2013.01); *H01S 3/06766* (2013.01); *H01S 3/0677* (2013.01); *H01S 3/1608* (2013.01)

(58) Field of Classification Search
CPC ........... H01S 3/094061; H01S 3/06766; H01S 3/0677; H01S 3/1608

USPC ...................................................... 359/341.33
See application file for complete search history.

(56) References Cited

U.S. PATENT DOCUMENTS

| | | | |
|---|---|---|---|
| 6,580,552 B2 * | 6/2003 | Welch ................. | H01S 3/06754 359/341.32 |
| 2003/0156792 A1 * | 8/2003 | Lawrence ............. | H01S 3/0632 385/27 |
| 2009/0201576 A1 * | 8/2009 | Bolshtyansky ..... | H01S 3/06754 359/341.33 |
| 2024/0162675 A1 * | 5/2024 | McClean .......... | H01S 3/094042 |

* cited by examiner

*Primary Examiner* — Daniel A Hess
(74) *Attorney, Agent, or Firm* — McAndrews, Held & Malloy, Ltd.

(57) ABSTRACT

A fiber-based optical amplifier is formed to exhibit a reflective architecture in a particular configuration where a single pump source is shared among several individual reflective amplifier elements. A passive, non-variable power splitter is used to direct sub-beams of sufficient power into the rare-earth doped fiber contained within individual amplifiers. Since the reflective architecture results in an optical signal passing through the doped fiber coil (gain medium) twice, a lower pump power (compared to a conventional single-pass structure) may be used to obtain the same target output power level and the single pump source is considered as sufficient to provide enough output power to pass through a power splitting arrangement and deliver enough pump power to provide amplification of a propagating optical signal in each of the individual amplifiers.

10 Claims, 6 Drawing Sheets

*FIG. 2*

PUMP-SHARING AMONG REFLECTIVE OPTICAL AMPLIFIERS

TECHNICAL FIELD

This disclosure relates to doped-fiber amplifier technology and, more particularly, to pump configurations for use in amplifier modules based on a reflective amplifier design.

BACKGROUND OF THE DISCLOSURE

Rare-earth doped fiber amplifiers (for example, erbium-doped fiber amplifiers (EDFAs)) may be used in applications where there are limitations in terms of physical size, electrical power, optical module count, optical gain fiber, and the like. A reflective EDFA is a useful design option in these cases, where a far-end termination of a doped-fiber coil includes a reflective element that enables an initially-amplified signal to pass through the doped fiber a second time to form the amplified output signal, as opposed to using two or more coils of gain fiber to create the same level of gain in a single-pass arrangement.

Besides a reduction in the physical length of doped fiber required to obtain a desired amount of amplification, it is contemplated that a reflective amplifier topology may provide additional benefits in applications where the optical noise figure (NF) (a known drawback in reflective designs) is not a primary concern. For example, optical transponders may be a suitable application for a reflective amplifier configuration, since there is no optical-to-electrical conversion and data recovery processes required.

SUMMARY

Disclosed herein is a reflective EDFA architecture suitable for use in applications where a reduction in factors such as physical size, electrical power consumption, component count, expense, etc., are important. In particular, a reflective EDFA system is proposed that shares a single pump source among several individual amplifiers by using a passive, non-variable power splitter to direct sub-beams of sufficient power to the individual amplifiers. Since the reflective architecture results in an optical signal passing through the doped fiber coil (gain medium) twice, a lower pump power (compared to a conventional single-pass structure) may be used to obtain the same target output power level. As a result, a conventional pump source is considered as sufficient to provide enough output power to be split into sub-beams and delivered to each of the individual reflective amplifiers. In particular, the pump beam output from a pump source may pass through a passive power splitting arrangement to create the individual pump sub-beams.

This pump-sharing configuration, in combination with suitable lengths (coils) of gain fiber (in particular, the "optical length" in terms of absorbance of gain dopant), has been found to somewhat relax the dependence between input signal wavelength (or input signal power) and pump power, allowing for the disclosed reflective EDFA system to operate over a defined input signal wavelength range without requiring adjustments to the pump source itself.

By virtue of using a passive optical power splitter to provide the pump sub-beams to each EDFA, the created amplifier system may be formed as a "closed" system that does not require any further adjustments during use. Alternatively, the reflective amplifier system may be formed as a modular arrangement that may be modified by adding/removing a section of gain fiber to adjust the optical signal wavelength range over which amplification may be generated. This is a useful feature when changing for use between the C-band wavelength range (about 1525-1575 nm) and the L-band wavelength range (about 1575-1625 nm).

The reflective element included within each EDFA may take the form of a fiber Bragg grating (or other wavelength selective device) that is configured to reflect wavelengths (both signal and pump) within a defined band, ideally absorbing any type of noise (including amplified spontaneous emission—ASE) generated during the amplification process. Each reflective amplifier may utilize a combination of an optical circulator and a wavelength division multiplexer (WDM) to direct the propagation of the optical signal (before and after amplification) and the pump sub-beam in an efficient manner with a minimal number of components. Indeed, these elements may be incorporated into a single hybrid component that further reduces the overall size of the reflective amplifier. A bidirectional optical tap may be included as an in-line element to monitor the amount of gain generated during amplification without unduly extending the size or complexity of the system.

An exemplary embodiment of the disclosure may take the form of a fiber-based optical amplifier module, comprising a plurality of N individual reflective optical amplifier elements, with a passive optical power splitter used to provide individual pump sub-beams to each amplifier element. In particular, each individual reflective optical amplifier element is formed to include a coil of rare-earth doped optical fiber (having a proximate end termination and a distal end termination) and an optical coupler disposed at the proximate end termination of the coil of rare-earth doped fiber optical. The optical coupler receives as separate inputs an optical signal at a known wavelength $\lambda s$ and a pump beam at a pump wavelength $\lambda_P$ selected to induce amplification of the optical signal in the presence of the rare earth dopant, where the optical coupler is configured to inject both the optical signal and the pump into the coil of rare-earth doped optical fiber for initiating amplification. Each reflective amplifier element also includes a reflective element disposed beyond the distal end termination of the coil of rare-earth doped optical fiber, where the reflective element is configured to redirect the optical signal to pass again through the coil of rare-earth doped fiber, exiting the distal end termination as an amplified output signal.

In some examples, an optical amplifier assembly may comprise the fiber-based optical amplifier module as described above as a "closed", self-contained arrangement, with an external pump source used to direct an incoming pump beam to the passive power splitter. Thus, the module is considered to be self-contained in that no electrical components are required to be included in the module, only passive optical devices are required and thus reduce the size Other and further embodiments of this disclosure may become apparent during the course of the following discussion and by reference to the accompanying drawings.

BRIEF DESCRIPTION OF THE DRAWINGS

Referring now to the drawings, where like numerals represent like elements in several views:

FIG. 2 illustrates an example of pump sharing between a pair of reflective EDFAs;

DETAILED DESCRIPTION

Figure 1:
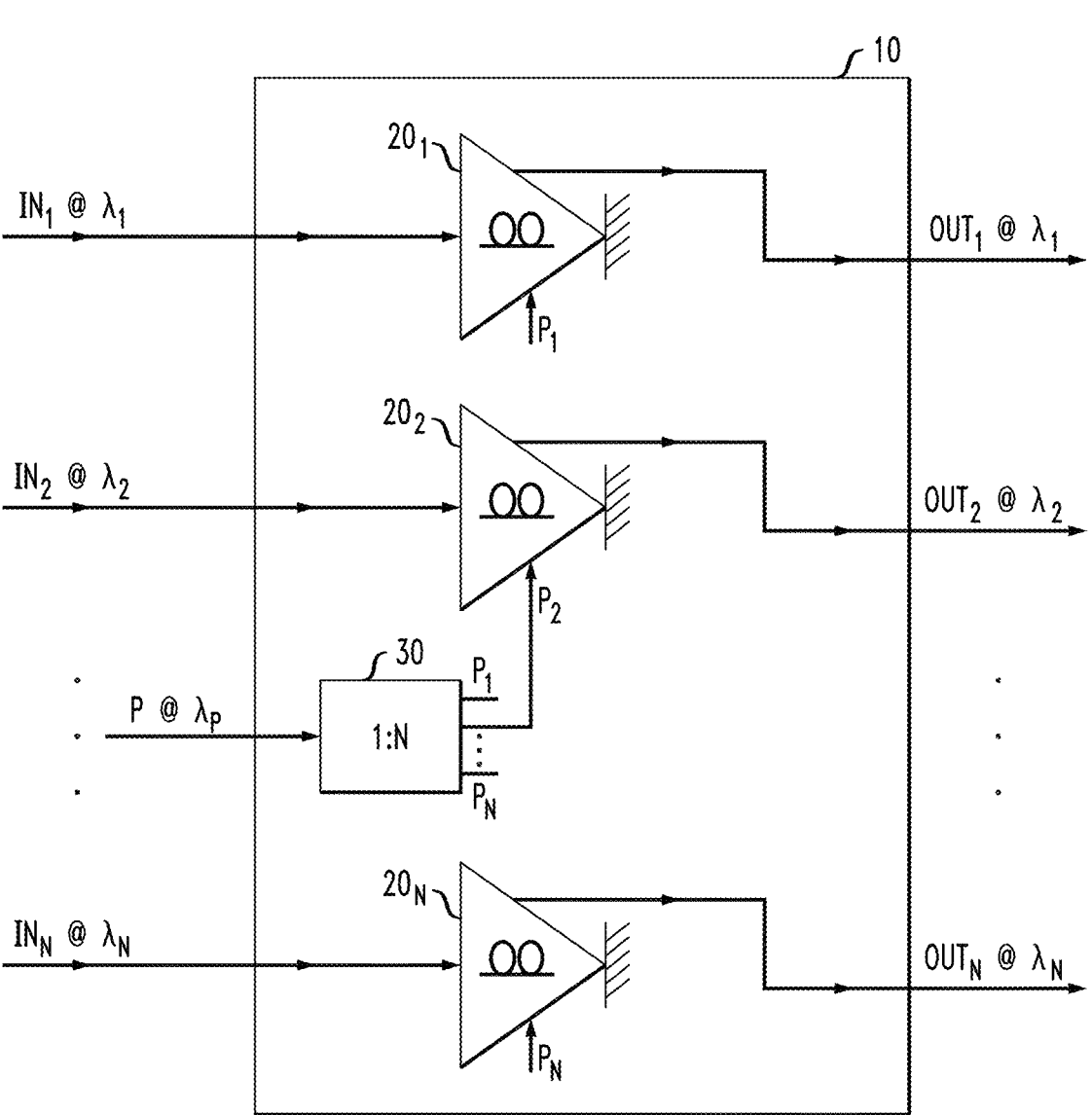
FIG. 1 is a general block diagram of reflective optical amplifier architecture.

FIG. 1 is a general block diagram useful in understanding the pump sharing principles of the disclosed reflective amplifier system. A pump-sharing reflective optical amplifier module 10 is shown as comprising a plurality of N individual reflective fiber amplifier elements $20_1$-$20_N$. Each reflective fiber amplifier element $20_i$ is shown as responsive to an input optical signal $IN_i$ and generates an amplified version as an associated output signal $OUT_i$. As particularly illustrated in the following drawings, the inclusion of a reflective element at a termination of the coil of doped fiber within the amplifier allows for the optical signal $IN_i$ to pass back and forth through the doped fiber and experience amplification in each direction. The "double-pass" of the optical signal through the doped fiber means that less pump power is required to achieve the same level of optical gain as found with a conventional single-pass amplifier design using a same length of doped fiber.

Also shown in FIG. 1 is a pump beam P that operates at a wavelength $\lambda_P$ known to induce amplification in the presence of a certain rare earth dopant within the coil of fiber. When using Erbium as the dopant in the amplifying fiber, a pump beam P operating at a wavelength $\lambda_P$ of about 980 nm may be used to promote amplification of optical wavelengths typically used in communication systems (e.g., C-band or L-band). A typical laser source is able to create a pump beam P with an output power on the order of hundreds of mW; in the reflective EDFA amplifier as used in the disclosed system, a lower power on the order of tens of mW has been found sufficient to create a target level of gain for the output signals. Therefore, in accordance with the principles of the present disclosure, a passive power splitter 30 is included within reflective amplifier module 10 and used to create a set of lower-power pump sub-beams from the original pump beam P, providing a compact and reduced cost multi-amplifier assembly.

Power splitter 30 is depicted in FIG. 1 as a 1:N power splitter, creating a plurality of N pump sub-beams that are applied as inputs to the individual reflective amplifiers 20 (referred to at times hereafter as "reflective EDFAs 20"). This is specifically illustrated in FIG. 1 as pump sub-beam $P_1$ applied as an input to reflective EDFA $20_1$, pump sub-beam $P_2$ to reflective EDFA $20_2$, and so on, with pump sub-beam $P_N$ applied as an input to reflective EDFA $20_N$. In this example, power splitter 30 is configured as a 1:N ratio power splitter such that each sub-beam exhibits about the same power fraction; other arrangements may use other power splitting ratios. The reflective EDFA arrangement, as noted above, allows for a relatively low level of pump power to be sufficient to reach a target amplification level and therefore permits for a pump source of a conventional power level to be divided between the individual amplifier elements.

A reflective EDFA using a relatively low power pump to create amplification has been found to exhibit minimal dependence on its input conditions (i.e., input signal wavelength and/or input signal power). Therefore, in the disclosed pump-sharing arrangement, each individual amplifier is able to achieve the same target output signal power by using equal power fractions of the input pump power, even when their input signals are using different wavelengths and exhibit some different signal powers.

The use of different input wavelengths is particularly illustrated in reflective amplifier module 10 of FIG. 1, which illustrates module 10 as receiving a plurality of N separate input signals $IN_1$-$IN_N$, each operating at (possibly) a different wavelength $\lambda_1$-$\lambda_N$ within a defined signal band used by a particular application. In an example arrangement, the individual wavelengths may be provided by a single source (such as a parametric frequency comb or other type of optical device known in the art for generating several individual wavelengths useful in a multi-wavelength communication system).

As mentioned above, reflective amplifier module 10 may be configured as a C-band amplifier (accepting input signals across a wavelength band kc extending between about 1525-1575 nm) or an L-band amplifier (wavelength band L extending between about 1575-1623 nm), or any other suitable band useful for optical communication purposes. While operable within a defined wavelength range, each individual EDFA element $20_i$ is considered as a "single channel" amplifier; that is, the optical signal applied as input to a given reflective EDFA $20_i$ is a single-wavelength input signal (as opposed to a multi-wavelength input).

Figure 2:
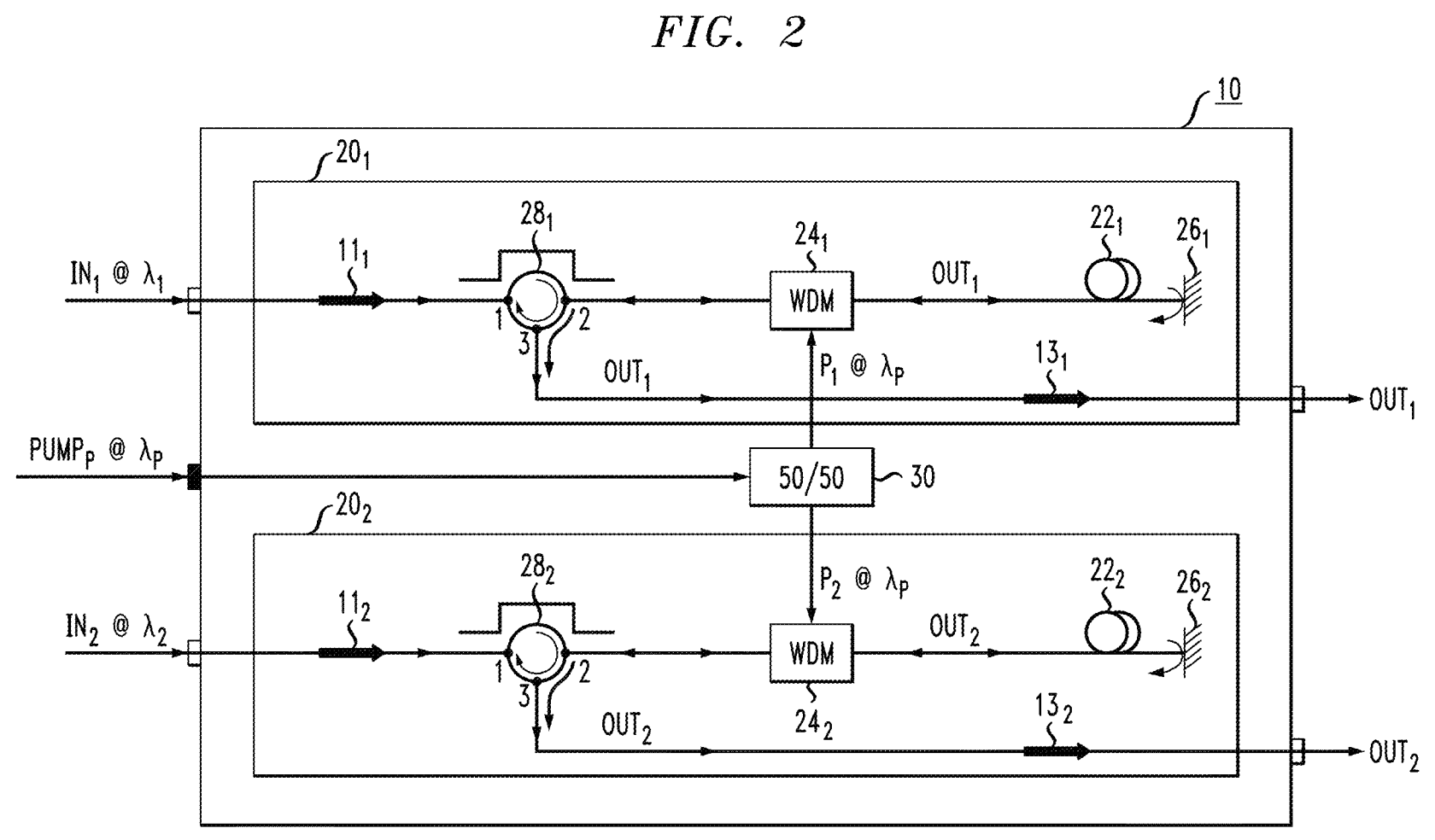

FIG. 2 illustrates a specific example embodiment of reflective amplifier module 10 utilizing pump sharing in accordance with the principles of the present disclosure. In this example, reflective amplifier module 10 includes a pair of individual reflective EDFAs $20_1$, $20_2$. A pair of individual input optical signals $IN_1$, $IN_2$ is introduced to module 10, and reflective EDFAs $20_1$, $20_2$ are used to create a pair of amplified output signals $OUT_1$, $OUT_2$. Again, while each of these inputs is defined as a "single channel" input (that is, operating at a specific signal wavelength), the particular wavelength selected for use by an individual reflective EDFA may be any desired value within a defined bandwidth utilized by the system including reflective amplifier module 10. For example, reflective amplifier module 10 may be configured as a C-band amplifier, where input wavelength $\lambda_S$ may be anywhere within the wavelength range of about 1525 nm to 1575 nm. In another example, amplifier module 10 may be configured for use with L-band signals operating over a wavelength range of about 1575-1625 nm. These are just two examples, any other reasonable optical signal operating range may be used as well.

Continuing with the description of FIG. 2, first input signal $IN_1$ is shown as applied as an input to first reflective EDFA $20_1$ and second input signal $IN_2$ is applied as an input to second reflective EDFA $20_2$. Each EDFA 20 includes a section of Erbium-doped fiber (EDF) 22 that is used to increase the optical power of the propagating input signal in the presence of the applied pump sub-beam (either $P_1$ or $P_2$). Each EDFA 20 is shown as including a WDM 24 that is disposed at the input to EDF 22 and configured to multiplex the pump sub-beam operating at a wavelength $\lambda_P$ with an optical signal operating at a wavelength of either $\lambda_1$ or $\lambda_2$ (as the case may be) onto a common signal path input to its associated EDF 22.

In accordance with the principles of this disclosure, the reflective design of EDFAs 20 permits the use of a lower level of pump power (as compared to single-pass configurations) to provide a target output power level, regardless of the particular wavelength of the input signal (within the defined range used in the amplifier) and/or the power level of the particular input signal. Therefore, EDFA module 10 is able to share a single pump source (providing an output pump beam of a typical power) between EDFAs $20_1$ and $20_2$. To accomplish this, FIG. 2 shows a single pump P that is used to deliver pump energy to both reflective EDFA $20_1$ and reflective EDFA $20_2$. In this particular example, a pump beam P operating at a wavelength $\lambda_P$ is provided as an input to reflective amplifier module 10 (or, alternatively, is included within module 10). Passive power splitter 30 is included within amplifier module 10, as shown and discussed above in association with FIG. 1. In this example, a 1:2 ratio passive power splitter 30 (also referred to at times as a 50/50 passive power splitter) is used to divide the incoming pump beam P into sub-beams of essentially equal power, with a first pump sub-beam $P_1$ applied as an input to WDM $24_1$ and a second sub-beam $P_2$ applied as an input to WDM $24_2$.

With particular reference to first reflective EDFA $20_1$ (with the understanding that EDFA $20_2$ includes the same elements and functions in the same manner), pump sub-beam $P_1$ interacts with the rare-earth dopant (Er) within EDF $22_1$ in a manner that induces a gain in optical power for input signal $IN_1$ (operating at a known wavelength $\lambda_1$). The initially amplified version of $IN_1$ exits EDF $22_1$ and impinges a reflective element $26_1$ disposed beyond a far-end termination of EDF $22_1$. As indicated by the curved arrow, reflective element $26_1$ functions to redirect the initially amplified signal $IN_1$ to pass a second time through EDF $22_1$ and be further amplified as a result of the continued presence of pump sub-beam $P_1$ within EDF $22_1$. In some examples, reflective element 26 may take the form of a wavelength-selective filter (for example, a fiber Bragg grating) configured to reflect signals within a defined wavelength band of the system. An input isolator 11 and an output isolator 13 are also illustrated as components within each reflective EDFA 20, where these elements are typically included in a fiber amplifier structure to prevent reflections from interrupting the operation of the amplifier.

As discussed above, an acceptable amount of gain is able to be generated in the presence of a relatively low power pump beam (for example, on the order of several tens of mWs) since amplification occurs as the input signal passes in each direction through EDF $22_1$. The twice-amplified version of $IN_1$ exiting EDF $22_1$ in the reverse direction is defined as amplifier output signal $OUT_1$ of reflective EDFA $20_1$. Amplified output signal $OUT_1$ is shown in FIG. 2 as passing through WDM $24_1$ a second time before exiting reflective amplifier module 10.

In the embodiment as shown in FIG. 2, each reflective EDFA 20 further comprises an optical circulator 28 that is implemented as part of the reflective architecture to control the propagation direction of the various signals and ensure that the amplified output signals are directed out of reflective amplifier module 10. As shown with respect to reflective EDFA $22_1$, optical circulator $28_1$ is disposed prior to the input to WDM $24_1$ so as to receive input signal $IN_1$ (at input port 1 of circulator $28_1$). Input signal $IN_1$ propagates within circulator $28_1$ along a defined path and exits at bidirectional port 2 of optical circulator $28_1$. Bidirectional port 2 of optical circulator $28_1$ is shown in FIG. 2 as coupled to an input of WDM $24_1$, thus directing the incoming optical signal toward EDF $22_1$. Thereafter, the input signal $IN_1$ proceeds in the manner described above to pass through EDF $22_1$ a first time, and then be redirected to pass through EDF $22_1$ a second time after being redirected by reflective element $26_1$.

The amplified optical signal exiting after a second pass through EDF $22_1$ (that is, amplified output signal $OUT_1$) will then propagate through WDM $24_1$ and thereafter be directed into bidirectional port 2 of optical circulator $28_1$. Amplified output signal $OUT_1$ will continue to propagate through optical circulator $28_1$, exiting at output port 3. As shown in FIG. 2, output port 3 of optical circulator $28_1$ becomes one of the output optical ports of amplifier module 10.

In the configuration as shown in FIG. 2, therefore, an externally-applied pump beam P may be shared between the pair of reflective EDFAs $20_1$ and $20_2$ by the use of a passive power splitter, reducing the component count and need for individual pump sources as compared to some prior art arrangements.

Figure 3:
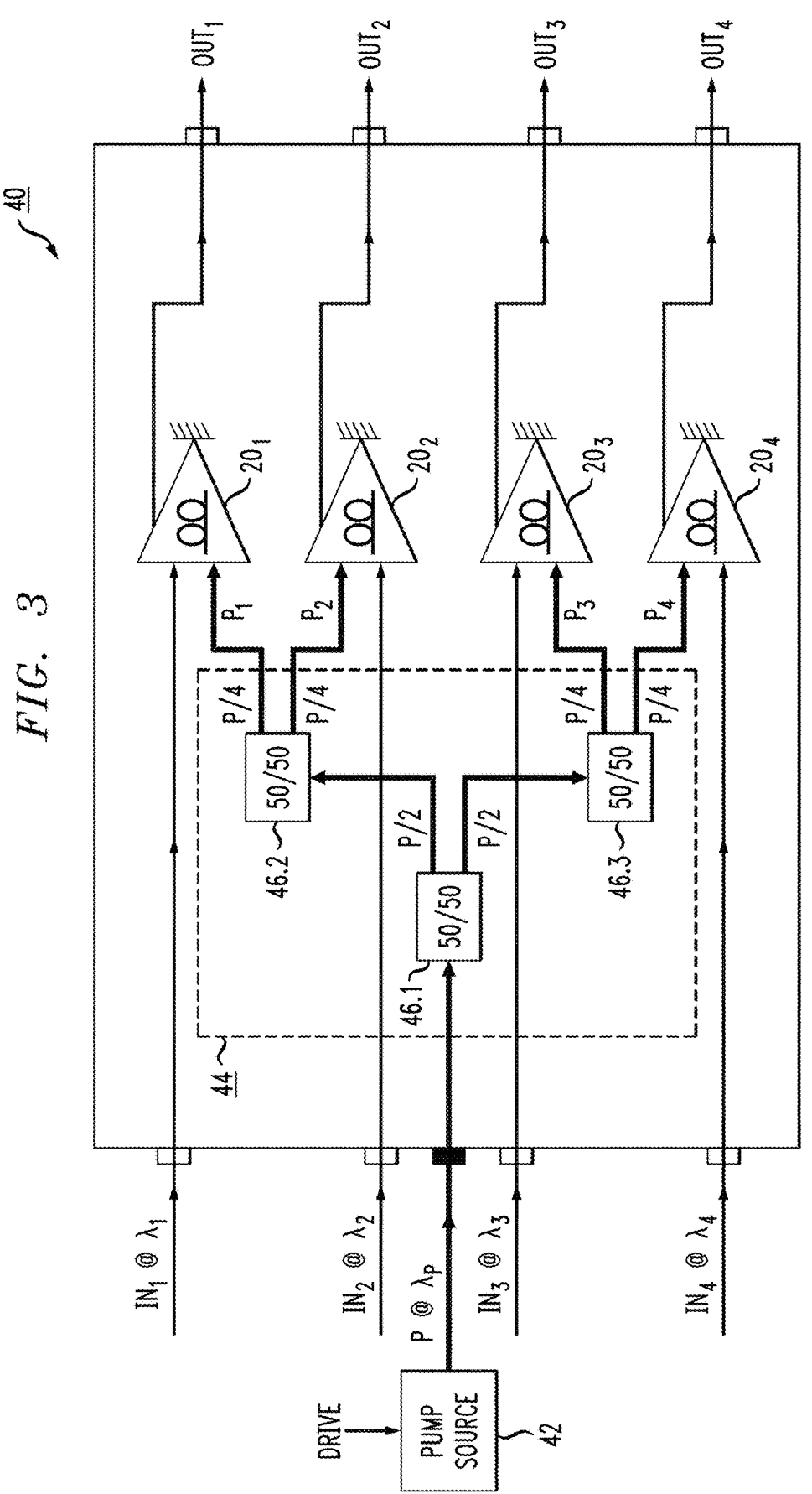
FIG. 3 shows another example of pump sharing in a reflective amplifier arrangement, in this case sharing a single pump among a set of four individual EDFAs.

FIG. 3 illustrates another embodiment of a shared pump reflective EDFA module of this disclosure, where in this case a reflective amplifier module 40 includes several individual reflective EDFA elements that share a single pump source. Here, a set of four reflective EDFAs $20_1$-$20_4$ is used to amplify a set of four input signals $IN_1$-$IN_4$ (respectively) and generate a set of four amplified output signals $OUT_1$-$OUT_4$. In this illustration, each input signal is shown as operating at a different wavelength (depicted as $\lambda_1$-$\lambda_4$) within a known operating range of reflective amplifier module 40. For example, all of the operating wavelengths may be within the C-band range of about 1525-1575 nm. This is only one example; indeed, there may be applications where the same wavelength may be used by multiple EDFAs 20, such as when the communications are thereafter directed along different fiber spans to different receiver destinations.

In accordance with the principles of the present disclosure, a single pump source 42 is utilized in this example to provide sub-beams of sufficient power to operate all four reflective EDFA elements $20_1$-$20_4$. Pump source 42 generates a pump beam P at a pump wavelength $\lambda_P$ (and suitable input power) known to induce gain within the doped fiber of reflective EDFAs 20, with pump beam P applied as an input to reflective amplifier module 40. Advantageously, the implementation of pump source 42 as an external component (external with respect to the boundaries of module 40), further simplifies the assembly of module 40 by not requiring the use of any electrical drive signals, as necessary for operation of pump source 42, within module 40 itself.

Reflective amplifier module 40 is shown as including a passive power splitting arrangement 44 that is configured to create a set of four pump sub-beams of essentially equal power from the applied input pump beam P. In this particular arrangement of reflective amplifier module 40, passive power splitting arrangement 44 includes a first power splitter 46.1 that receives the incoming pump beam P and creates a pair of sub-beams of equal power (shown as P/2 for illustrative purposes). That is, a conventional 50/50 splitter is used to provide this initial division of the pump power. Each half-power sub-beam output from first power splitter 46.1 is thereafter applied as an input to another 50/50 power splitter, with a first half-power sub-beam applied as an input to a second power splitter 46.1 and a second, remaining half-power sub-beam applied as an input to a third power splitter 46.3. The pair of outputs from second 50/50 power splitter

46.2 each exhibit about one-quarter of the input pump power (shown as P/4), with a first quarter-power sub-beam $P_1$ applied as the pump input to first reflective EDFA $20_1$ and a second quarter-power sub-beam $P_2$ applied as the pump input to second reflective EDFA $20_2$. In a similar manner, third power splitter 46.3 provides third and fourth quarter-power pump sub-beams $P_3$ and $P_4$, applied to reflective EDFAs $20_3$ and $20_4$, respectively.

In accordance with the principles of the present disclosure, therefore, the ability to share a single pump source among several individual reflective EDFAs in this fashion, using a passive power splitting arrangement, is considered to significantly reduce the component count, size, and complexity of such an amplifier system (which would otherwise utilize separate pump sources for each amplifier, with a separate electrical drive signal required to energize each pump).

The illustration of FIG. 4, again depicting reflective amplifier module 40, is presented in a manner that emphasizes the closed, self-contained configuration that may be created by virtue of pump-sharing among reflective EDFAs. Particularly shown here is a plurality of N input optical ports 400, used to receive a plurality of incoming optical signals. In example embodiments, the input signals may be propagating along a plurality (array) of optical fibers that are coupled to input ports 400 in a one-to-one arrangement. A plurality of N optical signal ports 410 is shown as also formed on the exterior of module 40, where a plurality of output signal paths (again, perhaps an array of optical fibers) are coupled to output ports 410. Lastly, pump signal P is shown as entering reflective module 40 via a pump inlet port 420 (again, perhaps propagating along an optical fiber that is coupled to this port).

Figure 4:
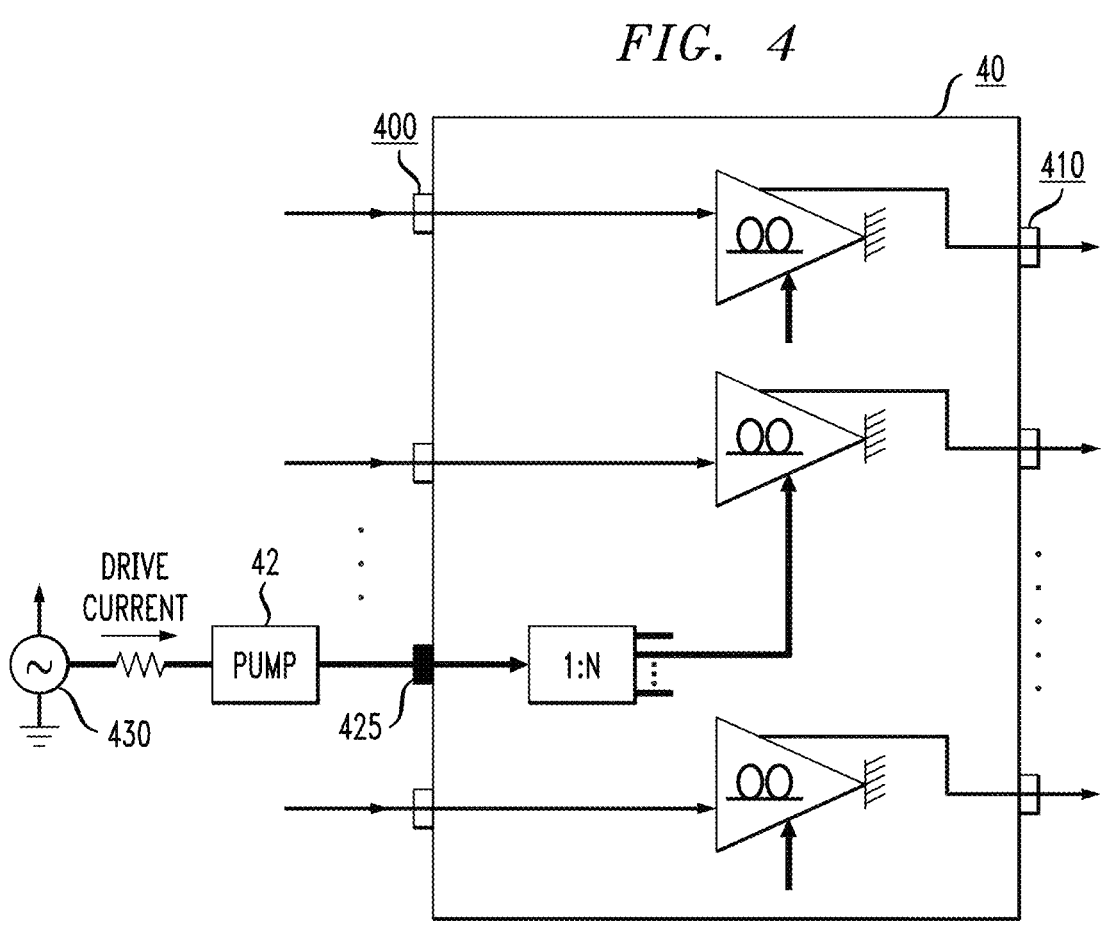
FIG. 4 is a somewhat simplified view of the example of FIG. 3, illustrating the self-contained configuration of optical elements within the module, with an external source used to supply the required pump beam.

As described above, pump source 42 is preferably located outside of the collection of passive optical devices forming reflective amplifier module 40. Also shown in FIG. 4 is an input drive current source 430 that is used to energize pump source 42 and generate pump beam P as an output. Therefore, it is contemplated that a reflective fiber amplifier module formed in accordance with the present disclosure may be implemented as a "closed" module, with the pump beam and optical signals applied as inputs to the module and amplified output signals exiting the module. There is no need to include pump sources within the amplifier module itself, further reducing cost and complexity of the design and forming a truly "pluggable" optical amplifier with no internal electronics, or other similar compact configurations as appropriate for particular applications (e.g., a "linear drive" as being proposed for coherent communication systems).

As shown in the embodiments of both FIGS. 2 and 3, the individual reflective EDFA amplifier elements 20 may be responsive to input signals operating at different wavelengths (yet all "single channel" amplifiers) and perhaps different input powers and still share a common pump source. In implementation, the pump power is passively and non-variably split out to these multiple EDFAs.

Figure 5:
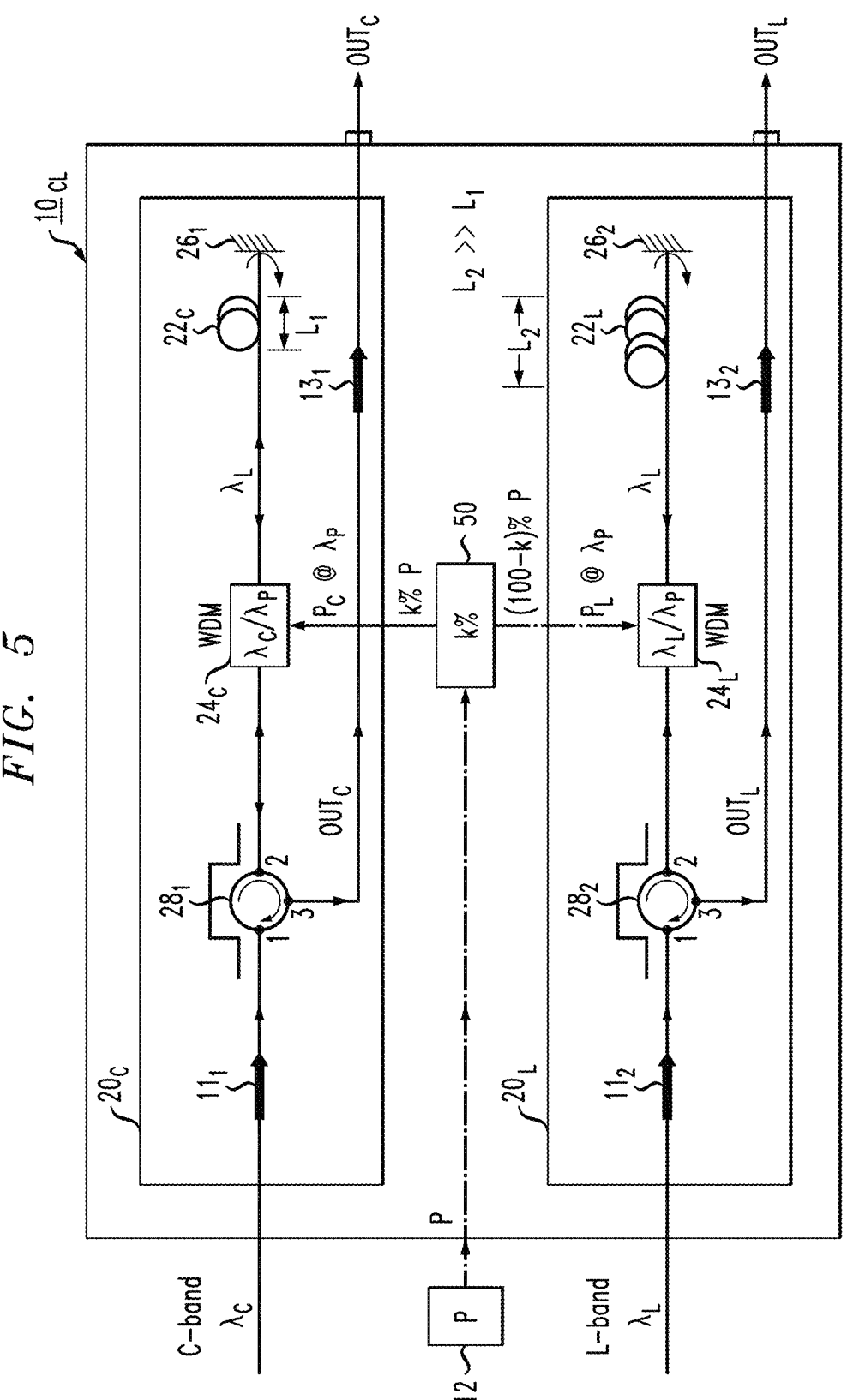
FIG. 5 illustrates an alternative pump sharing amplifier arrangement, in this case using an uneven power splitting ratio so as to provide optimum pump energies to a C-band reflective amplifier sharing the pump source with an L-band reflective amplifier.

FIG. 5 illustrates an alternative configuration of pump-sharing reflective amplifier module 10 of FIG. 2. In this particular alternative configuration, each individual reflective EDFA element is particularly configured to amplify optical input signals operating within different wavelength bands, yet remain able to share a single pump source. For the purposes of illustration, the arrangement of FIG. 5 is denoted as reflective amplifier module $10_{CL}$, with a first reflective EDFA element $20_C$ configured to amplify C-band optical input signals and a second reflective EDFA element $20_L$ configured to amplify L-band optical input signals.

As understood by those skilled in the art, one requirement for obtaining amplification within the longer wavelength range of L-band input signals is the need to use a longer length of gain fiber in order to provide enough interactive material to allow for longer wavelength signals to be sufficiently amplified. With reference to FIG. 5, therefore, C-band reflective EDFA element $20_C$ is shown as including an EDF $22_C$ of a first length $L_1$, and L-band reflective EDFA element $20_L$ is shown as including an EDF $22_L$ of a second length $L_2$, where $L_2 > L_1$.

Advantageously, it remains possible to again utilize a single pump source to provide pump sub-beams of sufficient power to both EDFA element $20_C$ and EDFA element $20_L$. In this example, however, a different passive split in pump power is necessary so that both C-band and L-band signals may be amplified. Referring to FIG. 5, reflective amplifier module $10_{CL}$ is shown as including a passive power splitter 50 that is configured to have a power ratio selected such that a larger portion of the pump power is directed into EDFA $20_L$ to enable amplification of L-band optical signals. This is depicted in FIG. 5 as providing an output of k % of the pump power (denoted as $P_k$) into WDM $24_C$ and (100-k)% of the pump power ($P_{(100-k)}$) into WDM $24_L$ (where k<50). Therefore, as shown in this example, embodiments of the disclosed pump-sharing reflective amplifier arrangement may be configured to use pump power splitters that create uneven power fractions.

It is to be understood that in order to implement this type of reflective EDFA module with a shared pump source, the optical length of the doped fiber coil (i.e., the absorbance efficiency of the gain fiber) is one parameter that needs to be evaluated; said another way, the ability to use a low power pump with a condition-independent input signal is related to the performance of the gain coil. Each amplifier, regardless of input power or input signal wavelength, may utilize the same total amount of pump power to obtain the target output signal power. This allows the pump power to be passively and non-variably split out to these multiple EDFAs. C-band and L-band versions of the disclosed reflective amplifier arrangement may each be formed to operate with condition-independent pump power and therefore it is also possible to tune these such that the C and L-band versions require the same pump power to reach a given output signal power.

As mentioned above, in applications such as an optical transponder where the disclosed arrangement is used as a booster amplifier, the optical NF is not a significant concern, it is possible to utilize a reflective topology for the amplifier in the manner disclosed above. The reduction of required pump power lessens the strict control of input signal wavelength/power with respect to properties of the pump, creating an amplifier that is essentially independent of the input signal conditions (e.g., wavelength, power) and can be used in an optical transponder operating over a known wavelength range. Thus, as long as the properties of the gain medium (here, EDF 22) can be controlled and the length of the medium properly sized, a passive power splitter may be used in combination with the low power pump source to deliver sub-beams to each EDFA element and provide a sufficient amount of gain at a fixed pump power regardless of input signal wavelength and/or power.

Figure 6:
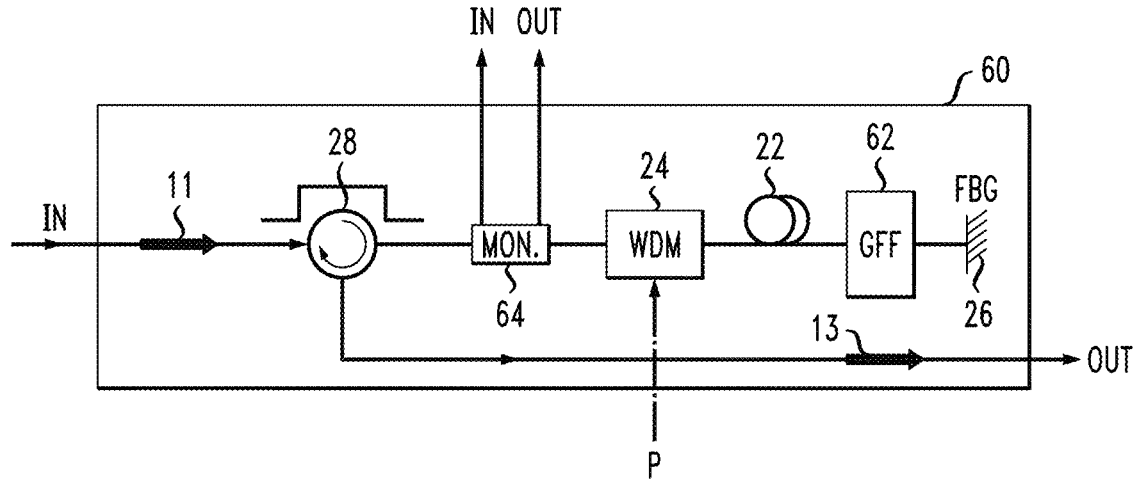
FIG. 6 shows an example reflective EDFA, including additional passive elements that may be incorporated, as needed for certain applications.

While not explicitly shown in these examples, it is to be understood that the individual reflective amplifier elements may include additional components useful in particular amplification applications. For example, a gain flattening filter (GFF) may be included within a reflective EDFA to reduce the amount of ASE that is generated as the input signal passes through the EDF (reducing out-of-band/global OSNR), as well as ensure that a target output power level is maintained regardless of the specific optical input signal wavelength. FIG. 6 shows a reflective EDFA element 60 including a GFF 62, positioned adjacent to reflective element 26. If reflective EDFA element 60 is configured for use as a C-band amplifier, for example, the ability to position GFF 62 between EDF 22 and reflective element 26 minimizes the impact of the flattening functionality on the output signal, as compared to conventional prior art single-pass EDFAs where the GFF is typically located immediately before the output port of the device.

Also shown in FIG. 6 is an optical tap 64 that may be included to measure the input and output power levels and thus monitor the gain achieved by each amplifier element. The particular configuration as shown in FIG. 6 takes the form of a bi-directional, in-line tap monitor, one example of which is described in our co-pending U.S. patent application Ser. No. 18/121,641 filed Mar. 15, 2023 and entitled "Bidirectional Optical Power Monitor," which describes a relatively compact type of optical tap and again does not require an appreciable increase in the overall size of the amplifier module.

Figure 7:
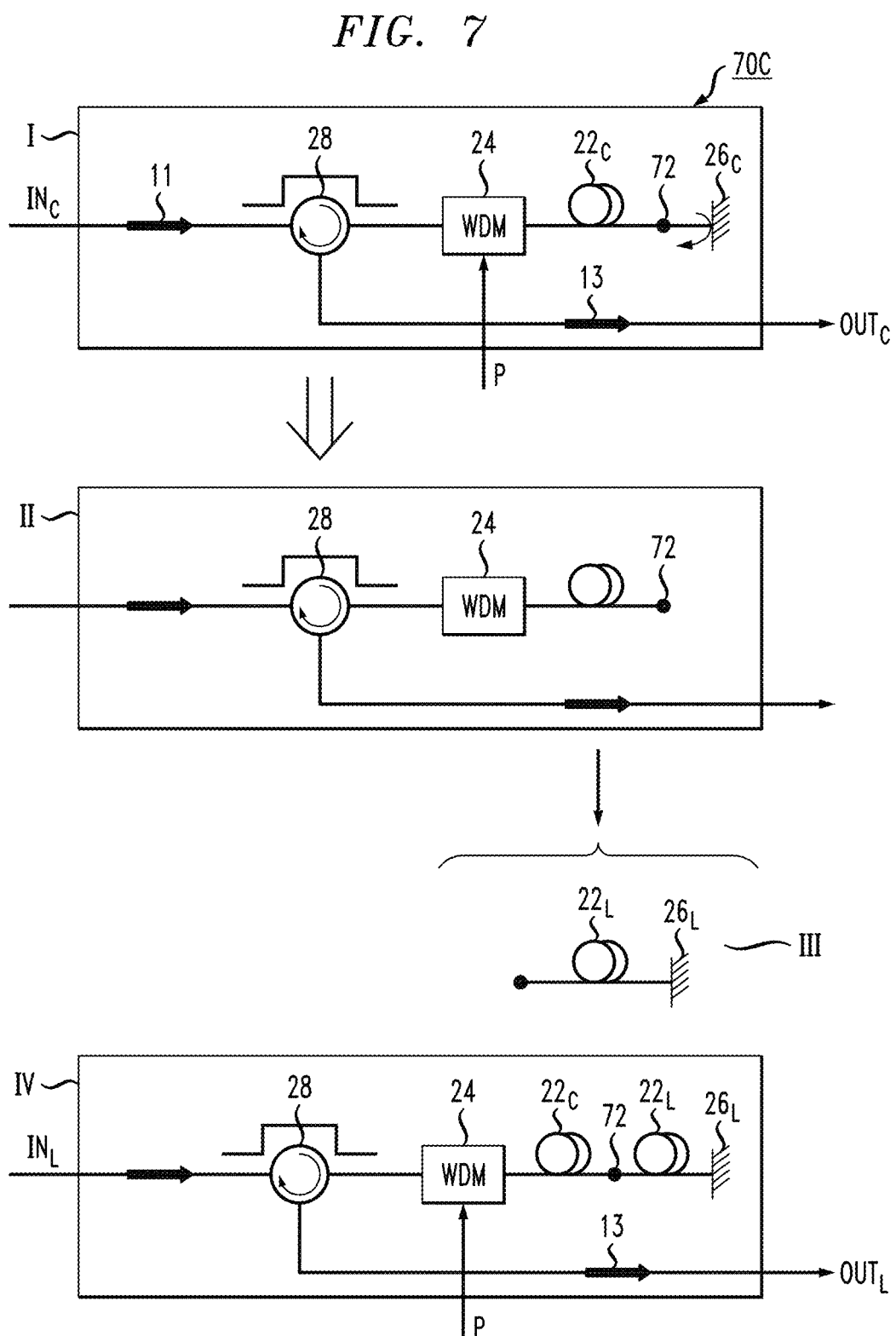
FIG. 7 illustrates a reconfigurable reflective amplifier formed in accordance with the disclosed principles.

The relatively compact arrangement of components in the disclosed reflective amplifier design may also allow for an individual reflective EDFA to not only be "pluggable" (as discussed above with respect to FIG. 4), but also easily modified, as shown in FIG. 7 which illustrates a modular type of reflective EDFA 70. In particular, drawing I in FIG. 7 shows an example reflective EDFA 70C that is formed to provide amplification of input optical signals within a first wavelength range (for example, a C-band amplifier). Besides the elements described above in association with reflective EDFA 20, reflective EDFA 70C is shown as including an internal connector element 72 disposed between EDF 22$_C$ and reflector 26C.

In accordance with this aspect of the disclosure, internal connector element 72 may allow for reflective element 26C to be removed, as shown in drawing II, when it is desired to use the reflective EDFA 70 as an L-band amplifier. A separate L-band element 74, as shown in drawing III of FIG. 7 may then be coupled to internal connector element 72. L-band element 74 is shown as including an additional section of EDF 22$_L$, as well as a reflective element 26L (which may be particularly configured for redirection of L-band signals). Drawing IV in FIG. 7 illustrates the reconfigured result, a reflective EDFA 70L, which is now capable of amplifying L-band optical signals.

It is to be understood that the described features, structures, or characteristics of the disclosed reflective amplifier system may be combined in any suitable manner in one or more embodiments that illustrate the aspects of this disclosure. One skilled in the relevant art will realize that the principles of the present disclosure may be practiced without one or more of the specific details, or with other methods, components, or the like. Thus, while the foregoing examples are considered to be illustrative of the disclosed principles, it is apparent to those skilled in the art that numerous modifications in form, usage, and details of implementation may be made without the exercise of inventive faculty, and without departing from the principles and concepts as presented in this disclosure. Accordingly, it is not intended that the subject matter of this disclosure be limited, except as by the claims set forth below.

What is claimed is:

1. A fiber-based optical amplifier module, comprising:
a plurality of N individual reflective optical amplifier elements, each individual reflective optical amplifier element including:
a coil of rare-earth doped optical fiber having a proximate end termination and a distal end termination;
an optical coupler disposed at the proximate end termination of the coil of rare-earth doped fiber optical, the optical coupler receiving as separate inputs an optical signal operating a known wavelength $\lambda$s and a pump operating at a pump wavelength $\lambda_P$ selected to induce amplification of the optical signal in the presence of the rare earth dopant, the optical coupler configured to inject both the optical signal and the pump into the coil of rare-earth doped optical fiber for initiating amplification; and
a reflective element disposed beyond the distal end termination of the coil of rare-earth doped optical fiber, the reflective element configured to redirect the optical signal to pass again through the coil of rare-earth doped fiber, exiting the distal end termination as an amplified output signal; and
a passive optical power splitter responsive to an incoming pump beam, the passive optical power splitter configured to divide the incoming pump beam into a plurality of N individual pump sub-beams, each sub-beam provided as the pump input to the optical coupler of a different one of the plurality of N individual reflective optical amplifier elements.

2. The fiber-based optical amplifier module as defined in claim 1, wherein the optical coupler of each individual reflective optical amplifier element comprises a wavelength division multiplexer.

3. The fiber-based optical amplifier module as defined in claim 1, wherein the passive optical power splitter is configured to create a plurality of N sub-beams of essentially equal optical power.

4. The fiber-based optical amplifier as defined in claim 3, wherein the passive power splitter comprises a multi-level arrangement of 50/50 power splitters.

5. The fiber-based optical amplifier module as defined in claim 1, wherein the passive optical power splitter is configured to create a plurality of N sub-beams with individual power levels selected in accordance with a length of the coil of rare-earth doped optical fiber.

6. The fiber-based optical amplifier module as defined in claim 5, wherein N=2, and the plurality of N individual reflective optical amplifier elements comprises
a first reflective optical amplifier element configured to provide amplification of a C-band input signal, using a coil of rare-earth doped fiber of length L1; and
a second reflective optical amplifier configured to provide amplification of an L-band input signal, using a coil of rare-earth doped fiber of length L2, where
the passive optical power splitter is configured to direct k % of the pump beam input power to the first reflective amplifier and (100-k)% of the pump beam input power to the second reflective amplifier, where K<50.

7. The fiber-based optical amplifier module as defined in claim 1, wherein each individual reflective optical amplifier element further comprises an optical circulator disposed at an input to the optical coupler, the optical circulator including an input port for receiving an applied optical input signal, a bi-directional port coupled to the optical coupler, and an output port for directing the amplified output signal along an exit signal path of the fiber-based optical amplifier module.

8. An optical amplifier assembly responsive to a plurality of N optical input signals and generating therefrom a plurality of N optical output signals, the optical amplifier assembly comprising:

a fiber-based optical amplifier module, comprising:

a plurality of N individual reflective optical amplifier elements, each individual reflective optical amplifier element including:

a coil of rare-earth doped optical fiber having a proximate end termination and a distal end termination;

an optical coupler disposed at the proximate end termination of the coil of rare-earth doped fiber optical, the optical coupler receiving as separate inputs an optical signal operating a known wavelength $\lambda_s$ and a pump operating at a pump wavelength $\lambda_P$ selected to induce amplification of the optical signal in the presence of the rare earth dopant, the optical coupler configured to inject both the optical signal and the pump into the coil of rare-earth doped optical fiber for initiating amplification; and a reflective element disposed beyond the distal end termination of the coil of rare-earth doped optical fiber, the reflective element configured to redirect the optical signal to pass again through the coil of rare-earth doped fiber, exiting the distal end termination as an amplified output signal; and a passive optical power splitter responsive to a pump input beam, the passive optical power splitter configured to divide the incoming pump beam into a plurality of N individual pump sub-beams, each sub-beam provided as the pump input to the optical coupler of a different one of the plurality of N individual reflective optical amplifier elements;

a pump source external to the fiber-based optical amplifier module, the pump source providing the pump input beam to the passive optical power splitter.

9. The optical amplifier assembly as defined in claim 8, wherein the fiber-based optical amplifier module is configured as a closed, self-contained component having only optical signal inputs and outputs.

10. The optical amplifier assembly as defined in claim 8, wherein one or more of the individual reflective optical amplifier elements is modular in form, allowing for insertion of an additional coil of rare-earth doped optical fiber and thereby modify an operating range over which amplification is performed.

* * * * *